United States Patent [19]
Morrow

[11] Patent Number: 5,635,017
[45] Date of Patent: Jun. 3, 1997

[54] APPARATUS FOR APPLYING CLOSURE TABS

[76] Inventor: Thomas A. Morrow, 2325 Susquehanna, Superior, Wis. 54880

[21] Appl. No.: 550,247

[22] Filed: Oct. 30, 1995

[51] Int. Cl.⁶ ............................................ B32B 31/00
[52] U.S. Cl. .................... 156/443; 156/444; 156/479; 156/521; 156/DIG. 38
[58] Field of Search .................. 156/443, 444, 156/479, 517, 521, 578, DIG. 31, DIG. 38

[56] References Cited

U.S. PATENT DOCUMENTS

| | | | |
|---|---|---|---|
| 4,004,962 | 1/1977 | Kleid | 156/444 X |
| 4,029,537 | 6/1977 | Kish | 156/DIG. 31 X |
| 4,160,687 | 7/1979 | Spear | 156/479 X |

*Primary Examiner*—James Engel
*Attorney, Agent, or Firm*—Palmatier, Sjoquist, Helget & Voigt, P.A.

[57] ABSTRACT

The present invention applies the leading edge of a closure tab to the top surface of an article traveling through the apparatus at a constant speed and positioned at precise intervals by lugs on a conveyor belt, bends the closure tab around the trailing surface using a blast of air, engages and accelerates the closure tab forwardly with respect to the article to press the closure tab on the bottom surface of the article with an inclined bottom belt located underneath the article and traveling at a greater rate of speed then the article itself, squeezes the article with two nonparallel belts located laterally at the position of contact with the closure tab to press the closure tab to the top and bottom surfaces of the article for closure.

9 Claims, 4 Drawing Sheets

APPARATUS FOR APPLYING CLOSURE TABS

BACKGROUND OF THE INVENTION

The present invention relates to a method and apparatus for applying closure tabs to two or more surfaces of articles such as books and magazines. Articles such as magazines, may be damaged in shipment and display by allowing the cover to open. A closure tab on the top and bottom surfaces prevents exposing the pages to damage by handling or dropping.

The present invention incorporates technology known in the art of applying identifying labels and adapts it for use in applying closure tabs. Identifying labels are applied to a variety of articles for attaching mailing addresses or other identifying information such as bar codes.

An identifying label is applied to an article by releasably grasping the identifying label and applying it to the article as it passes through a labeling machine.

Applying a closure tab to more than one surface of an article such as to the front and back cover of a book, involves an additional process step to affix the closure tab to multiple surfaces.

The prior art illustrates applying an identifying label to more than one surface by manipulating the article. In the prior art, an identifying label is applied to multiple surfaces by rotating the article in the labeling machine to wrap the identifying label around the article. As may be understood, when applying a closure tab to a top and bottom surfaces of an article such as a book or magazine, rotation of the article without damaging it is difficult, expensive and time consuming.

The present invention solves the problems in the prior art by attaching a closure tab to multiple surfaces of an article by a novel method and apparatus.

SUMMARY OF THE INVENTION

The present invention applies the leading edge of a closure tab to the top surface of an article traveling through the apparatus at a constant speed and positioned at precise intervals by lugs on a conveyor belt, bends the closure tab around the trailing surface using a blast of air, engages and accelerates the closure tab forwardly with respect to the article to press the closure tab on the bottom surface of the article with an inclined bottom belt located underneath the article and traveling at a greater rate of speed than the article itself, squeezes the article with two nonparallel belts located laterally at the position of contact with the closure tab to press the closure tab to the top and bottom surfaces of the article for closure.

A feature of the invention is a method and apparatus for securing a closure tab to an article such as a book without rotating the article.

Another feature of the present invention is a method and apparatus using a controlled air blast to manipulate the closure tab after the top surface edge portion has been affixed to the trailing edge of the top surface of the article.

Another feature of the present invention is an air nozzle directing air onto the extending portion of the closure tab to bend the closure tab.

Another feature of the present invention is an inclined conveyor traveling at a higher rate of speed than the article to accelerate and move the extending portion of the closure tab forwardly with relation with the trailing surface of the article.

Another feature of the present invention is two nonparallel belts used to squeeze the article between the top surface portion and the bottom surface portion of the closure tab to secure the closure tab to the article.

An advantage of the present invention is it may be practiced with either prepasted or non-prepasted closure tabs.

A further advantage of the present invention is it may be practiced without slowing the rate of speed of the articles traveling along a conveyor between manufacturing and shipping locations.

A further advantage of the invention is that it may be used with articles such as books or magazines without rotating the article to attach the closure tab to a plurality of sides.

A further advantage of the invention is two closure tabs may be applied simultaneously to an article by mounting two closure tab apparatuses next to each other.

DETAILED SPECIFICATION

Figure 1:
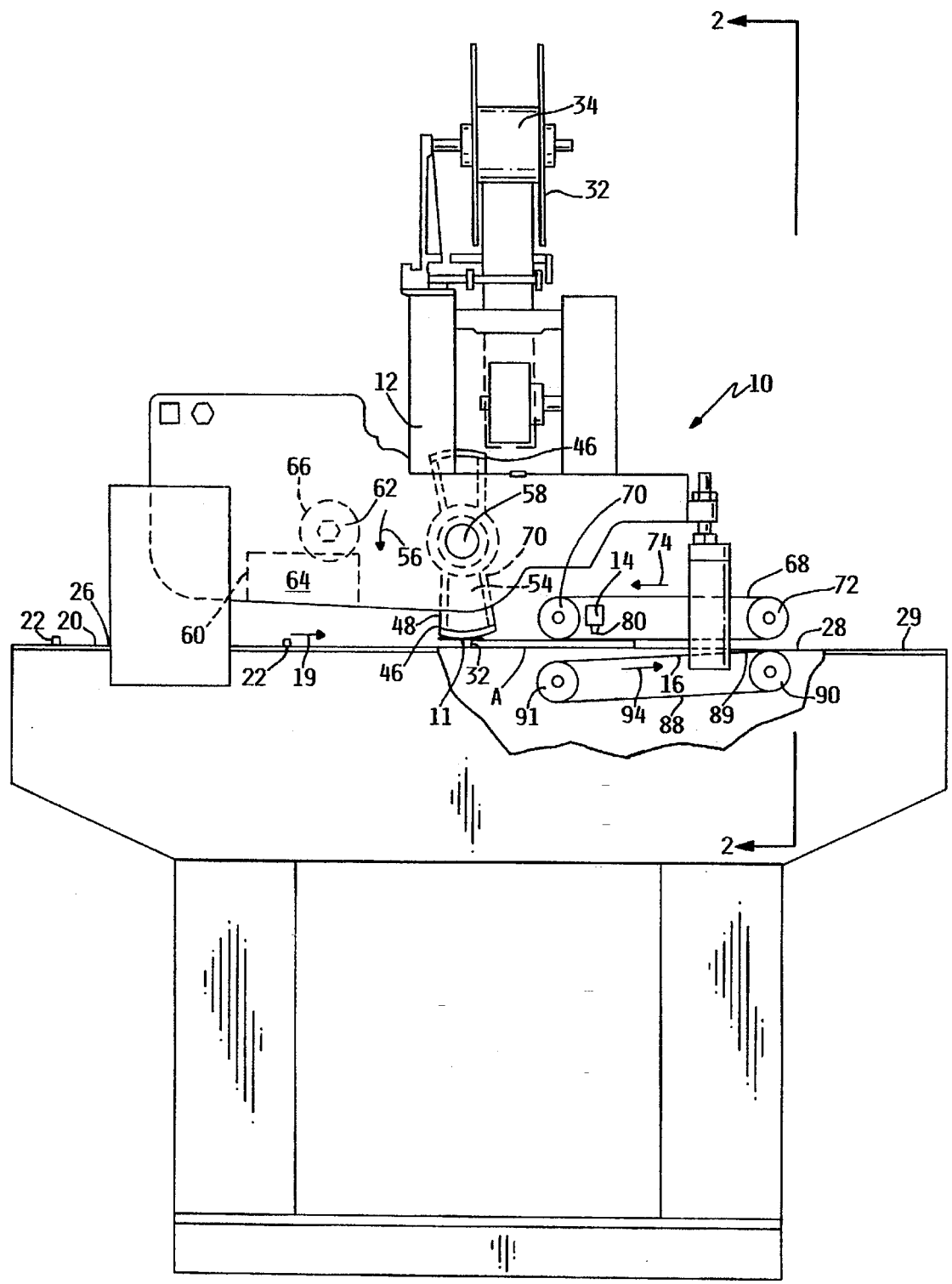
FIG. 1 is a side elevational view of an apparatus for applying a closure tab illustrating the closure tab top surface portion on the article top surface.

FIG. 1 illustrates a closure tab machine indicated in general by the numeral 10. The closure tab machine 10 generally comprises a tab applicator 12, a tab bender 14 and a tab wrapper 16. In the preferred embodiment, illustrated in FIG. 1, the article A travels through the closure tab machine 10 at a first speed, illustrated by arrow 19, on conveyor 20. The closure tab 11 is applied to the top and bottom surfaces of the article A.

The articles A are metered or precisely positioned within the closure tab machine 10 by lugs 22 located at precisely spaced intervals along the conveyor 20. Conveyor 20 extends from the closure tab machine entrance 26 to the exit 28. Articles leaving the exit 28 of the closure tab machine 10 are transferred to an exit conveyor 29 or manually removed. It should be understood that precise coordination of movement of the article A within the closure tab machine 10 is necessary to avoid damaging the article. It should be understood that movement in the closure tab machine may be synchronized by electrical or mechanical means alternatively as is known in the art of coordinated machinery movement.

Figure 3:
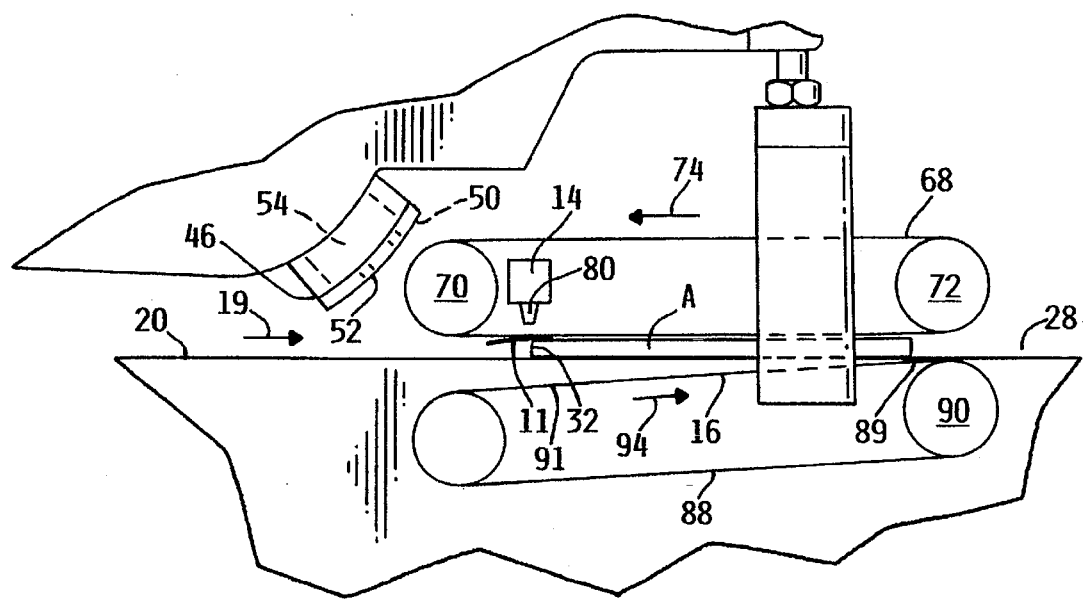
FIG. 3 is a detailed side elevational view illustrating the closure tab engaged by the top surface closure tab belt.
Figure 4:
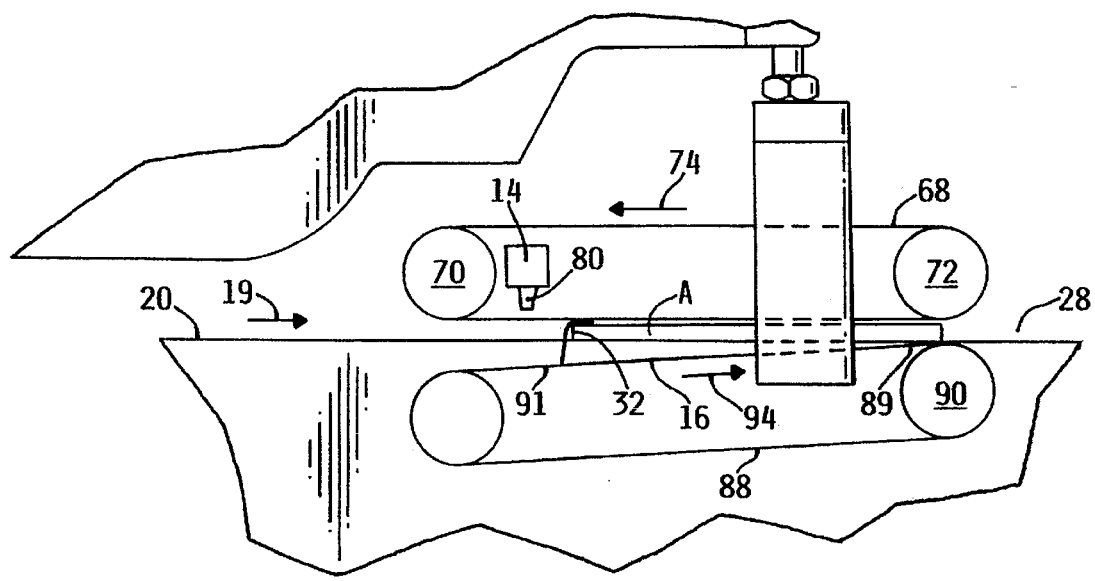
FIG. 4 is a detailed side elevational view illustrating the closure tab traversing the article trailing surface and engaged by the bottom surface closure tab belt.
Figure 5:
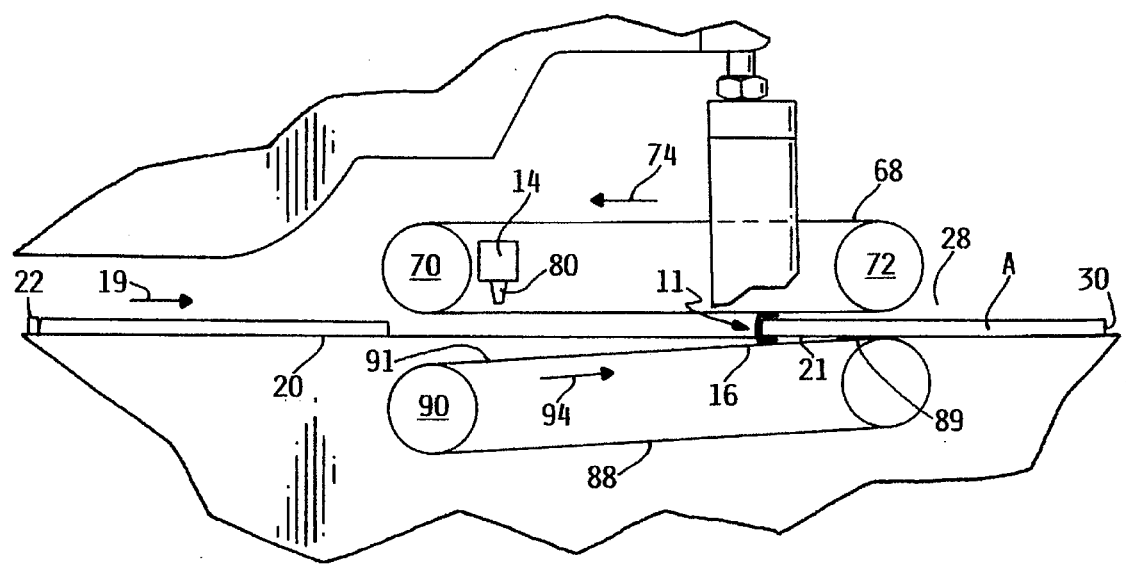
FIG. 5 is a detailed side elevational view illustrating the closure tab applied to the top and bottom surfaces of the article.

Tab applicator 12, for applying a closure tab 11 on the top surface of the article A, may be a commercially available identifying labeling machine such as series 400 available from MachTronic Products Co., Minong, Wis., adapted for applying closure tabs. The tab applicator 12 is synchronized with the conveyor 20 to apply the leading edge of the closure tab 11 on the top surface of article A and having the tab extend cantilevered out from the trailing edge of the article A as shown in FIGS. 1, 3 and 5.

Figure 2:
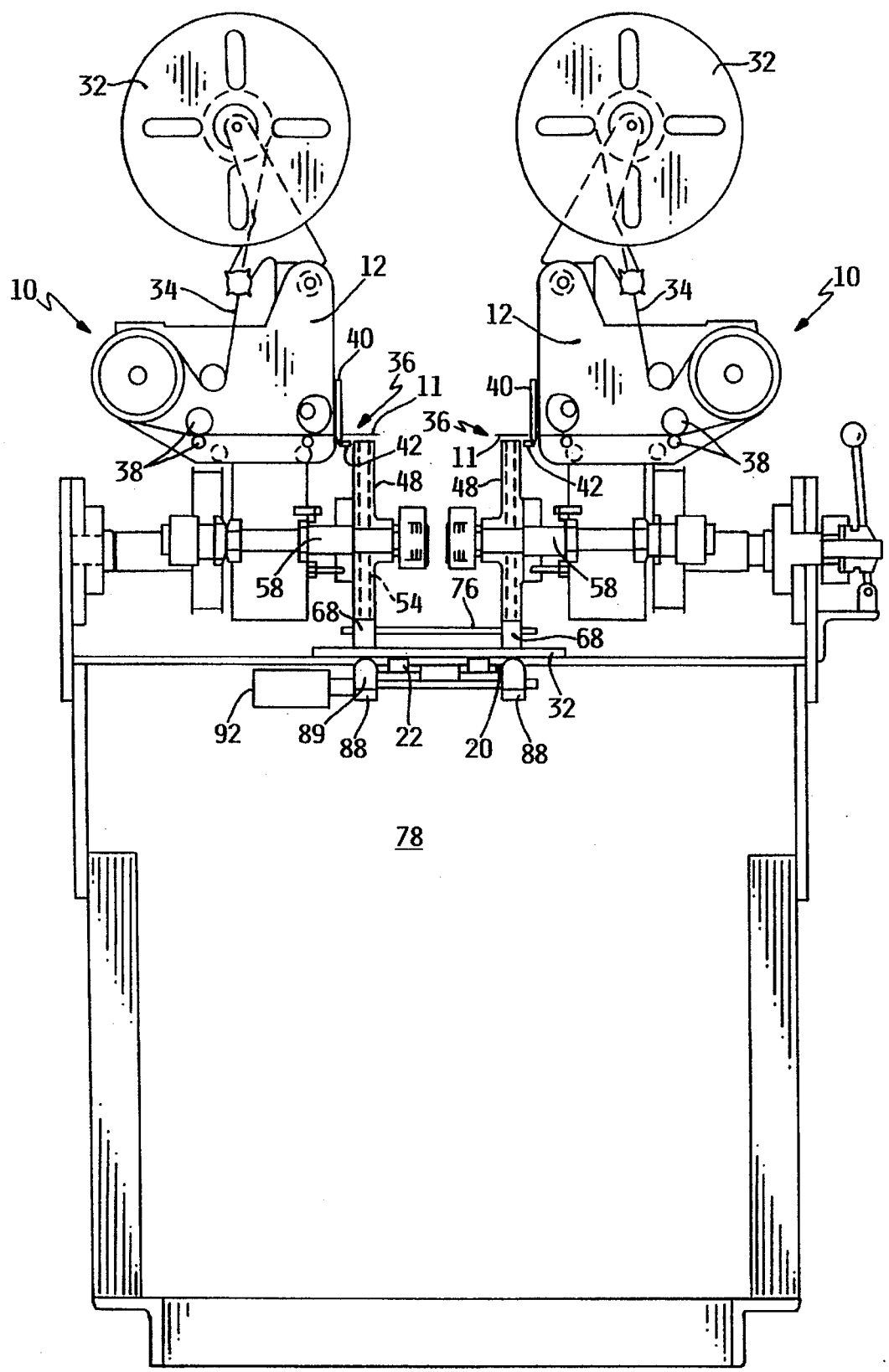
FIG. 2 is an end elevational view showing two closure tab apparatuses applying two closure tabs to an article.

As illustrated in FIGS. 1 and 2, a roll 30 of closure tab material 34 is on the tab applicator 12. A cutter 36 cuts the closure tab 11 from tab material 34. Closure tab material 34 is drawn from the roll 30 through a pair of pinch rollers 38. Pinch rollers 38 measure the amount of closure tab material 34 for each closure tab 11 and extend the material 34 into the cutter 36. The cutter 36 generally comprises a blade 40 and an anvil 42 which work together to cut the closure tab 11 from the closure tab material 34 and thus forming a closure tab 11 of a predetermined size and shape. Anvil 42 also comprises a pickup station as closure tab 11 extends from anvil 42 for pickup, after being cut from closure tab material 34 by blade 40. It should be understood cutter 36 may be bypassed if precut and prepasted closure tabs 11 on a continuous backing (not shown) are used. Closure tabs 11 may alternatively be supplied as a sheet or precut labels as is known in the art.

The tab shoe 48 engages the closure tab 11 at pickup station 48. In the preferred embodiment shown in FIGS. 1 and 2, the tab shoe 48 is a butterfly-shaped device having a pair of closure tab ends 46. The closure tab ends 46 shown in FIG. 3, each have a tab surface 50 having a series of vacuum holes 52. A vacuum chamber 54 is in the tab shoe 48 adjacent the tab end 46.

Vacuum holes 52 extend from the environment adjacent closure tab surface 50 to the vacuum chamber 54. A partial vacuum condition, of less than atmospheric pressure, is drawn in the vacuum chamber 54 by a vacuum source (not shown). Closure tab 11 is picked up at anvil 42 and is releasably retained by the force of the atmospheric pressure in the environment bearing against closure tab 11 at vacuum hole 52. The tab shoe 48 may alternatively be a belt, wand or other means known in the art of transporting tabs or labels.

Tab shoe 48 is attached to shoe drive shaft 58. Shoe drive shaft 58 is rotatably mounted on closure tab applicator 12 and is linked to conveyor 20 to synchronize the tab surface speed 56 with article speed 19.

A glue pot 60, shown in FIG. 1, is located adjacent vacuum transfer shoe drive shaft 58. Glue transfer wheel 62 extends into glue pot 60 to pickup glue 64 on surface 66. Glue transfer wheel 62 is rotatably mounted above glue pot 60. It should be understood surface 66 is positioned to bear against tab surface 50 and transfer glue to closure tab 11 as tab shoe 48 rotates with drive shaft 58. Alternatively, glue 64 may be applied to closure tab 11 by other methods well known in the art such as spraying, brushing, etc. Furthermore, the glue pot 60 and transfer wheel may be bypassed with the use of prepasted closure tabs (not shown).

Top belt 68 illustrated in FIGS. 1 and 3–6 intermediate tab shoe 48 and apparatus exit 28, extends between top belt drive pulley 70 and top belt idler pulley 72 and bears against the top surface of the article A. Top belt drive pulley 70 drives top belt 68 at speed 74.

As shown in FIG. 2, top belt shaft 76 may be used to connect more than one closure tab machine 10 in an assembly 78 for applying two closure tabs 11 to an article A. The linear speed 74 of top belt 68 is identical to the linear speed 19 of the article on conveyor 20. The top belt 68 may also be adjustable to engage articles having different sizes. Top belt 68 engages the article A between the drive pulley 70 and the idler pulley 72 and is laterally positioned to bear against the closure tab 11 affixed by the tab shoe 48 and press it onto the top surface of article A.

The tab bender 14, in the preferred embodiment, is an air nozzle 80 illustrated in FIGS. 3–6 intermediate drive pulley 70 and idler pulley 72. Air nozzle 80 is timed to precisely position a blast of air directly onto the closure tab 11 extending rearwardly from the top of the article A. Air nozzle 80 is spaced from the conveyor 20 to allow the article to pass intermediate the conveyor 20 and the air nozzle 80. It should be understood, the tab bender 14 may alternatively comprise a brush, wand or other device to bend closure tab 11.

Figure 6:
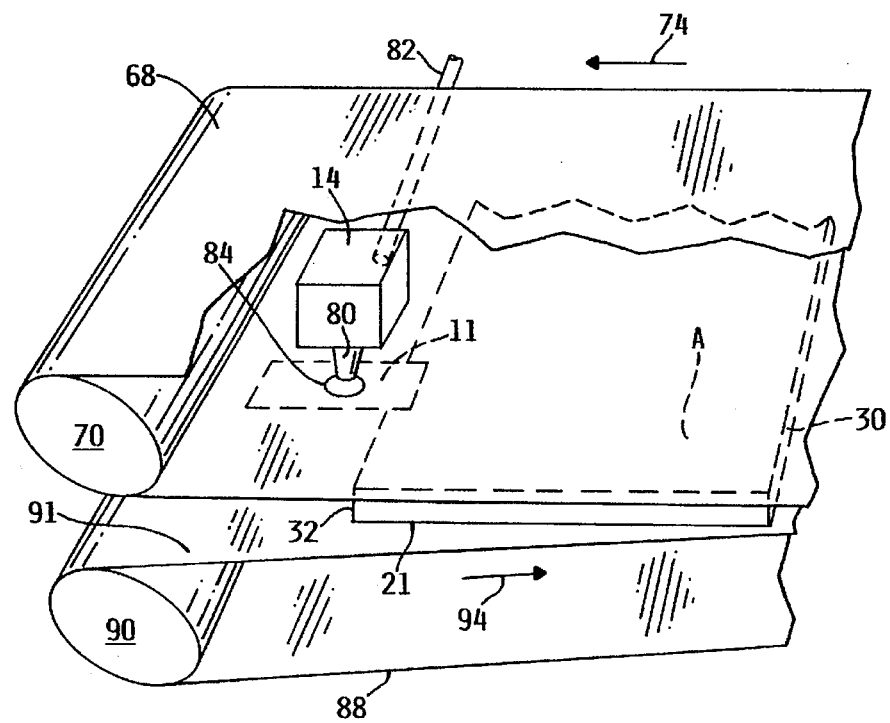
FIG. 6 is a detailed perspective view of the invention with a portion broken away to illustrate the timing hole.

Air timing hole 84 in top belt 68 permits air from nozzle 80 to be directed at article A to bend closure tab 11 as shown in FIG. 6. Timing hole 84 allows air to be directed at the article only when timing hole is intermediate air nozzle 80 and article A. It should be understood that the sequencing of the air blast from air nozzle 80 may also be with other mechanical or electronic means well known in the art of synchronized machinery movement and operation.

The trailing edge of closure tab 11 is moved downwardly by tab bender 14, and is wrapped around the trailing surface 32 and attached to the bottom surface of article A by tab wrapper 16. Tab wrapper 16 has a bottom belt 88 positioned below the conveyor 20. Bottom belt 88, is laterally aligned with top belt 68 and is inclined to engage the article with the upper end 89, near the exit 28, and engage the closure tab 11 with the lower end 91. The lower end 91 of the bottom belt 88 is between the upper end 89 and the entrance 26 of the closure tab machine 10 so the article A passes over the lower end 91 before the upper end 89.

Bottom belt 88 is driven at second drive pulley 90 by motor 92 and moves at a greater linear speed 94 than top belt 68 or the article 19. The trailing edge of closure tab 11 is accelerated to speed 94 causing the closure tab to be pushed forwardly relative to trailing surface 32. Bottom belt 88 bears against article A with the upper end as shown in FIG. 5 to press the closure tab 11 onto the bottom surface of article A. The closure tab 11 is securely attached by squeezing the article between the two belts 68, 88.

In operation, an article A such as a magazine enters the closure tab machine 10 at the entrance section 26 and is engaged by the conveyor 20. The conveyor 20 separates each article by engaging the article on the trailing surface 32 using lugs 22. The shoe drive shaft 58 rotates, causing the closure tab end 46 to travel on a circular path. As tab shoe 48 rotates with shoe drive shaft 58, tab surface 50 is moved close to anvil 42.

A closure tab 11 is cut from closure tab material 34. Closure tab 11, at anvil 42, is drawn to tab surface 50 by the vacuum force at vacuum hole 52 and moved on a circular path to bear against the transfer wheel 62 dressing the inside surface of the closure tab 11 with glue 64.

Tab shoe 48 rotates about the shaft 58 causing closure tab 11 to engage the top surface of article A. Closure tab 11 is released from tab surface 50 as partial vacuum condition is replaced by normal atmospheric condition in vacuum chamber 54. Tab surface 50 bears against and rolls over closure tab 11 to press the leading edge of the closure tab 11 onto the top surface of the article A. It should be understood, in the preferred embodiment, the speed 56 of the tab surface 50 is identical to the speed 19 of the article A.

A portion of the closure tab 11 is left extended from the trailing surface 32 supported by the adhesive attachment formed by the glue 64 between the closure tab 11 and the top surface of article A, as shown in FIGS. 1 and 3. An air blast from the tab bender 14 causes closure tab 11 to bend and traverse the trailing surface 32. The lower end 91 of bottom belt 88, traveling at speed 74, engages the closure tab 11 and moves it forwardly relative to the article. The bottom belt 88 is inclined to wrap the closure tab 11 around and engage the article at top end 89. The bottom belt forces the closure tab 11 to attach to the bottom surface.

Article A is squeezed between the two nonparallel belts 68, 88 as illustrated in FIG. 5 to firmly attach closure tab 11 to the top and bottom surfaces of article A. The article A is then conveyed to the closure tab apparatus exit 28.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. A closure tab machine for applying a closure tab to an article having top, trailing and bottom surfaces in combination with a conveyor moving the article forwardly at a first speed, the closure tab machine comprising:

(a) a closure tab applicator adjacent the conveyor;

(b) a closure tab bender adjacent the closure tab applicator; said closure tab bender comprising a top belt bearing against the article top surface, and an air nozzle adjacent the article top surface whereby air is directed by the air nozzle at the closure tab extending from the top surface to bend the closure tab about the article trailing surface, and an air timing hole in the top belt passing intermediate the air nozzle, whereby air is directed at the top surface only when the air timing hole is adjacent the air nozzle; and (c) a closure tab wrapper adjacent the closure tab bender whereby the closure tab applicator comprises means for pressing a leading edge of the closure tab onto the top surface, having the closure tab extending from the top surface, the tab bender comprising means for bending the closure tab about the trailing surface and the tab wrapper comprising means for pressing the closure tab onto the bottom surface.

2. The invention of claim 1, wherein the tab wrapper further comprises an inclined bottom belt having a lower end spaced from the article, the bottom belt moving at a second speed greater than the first speed whereby the bottom belt engages the closure tab and moves it forwardly with respect to the article trailing surface.

3. The invention of claim 2, wherein the bottom belt further comprises an upper end bearing against the article to press the closure tab onto the bottom surface.

4. The invention of claim 3, wherein the tab bender further comprises a top belt engaging the article top surface and the leading edge of the closure tab whereby the closure tab is pressed onto the top and bottom surface by squeezing the article with the top and bottom belts simultaneously.

5. A closure tab machine for applying a closure tab to a plurality of sides of an article, the article having top, trailing and bottom surfaces, a conveyor having lugs engaging the article to move it at a first speed, a closure tab having a leading edge, the closure tab machine comprising:

(a) a closure tab applicator comprising a shoe drive shaft rotatably mounted adjacent the conveyor, a tab shoe on the shoe drive shaft having a tab surface, the closure tab releasably retained on the tab surface;

(b) a top belt parallel to the conveyor and adjacent the article path of travel, the top belt spaced from the conveyor to engage the top surface of the article, the top belt moving at a speed equal to the first speed;

(c) an air nozzle adjacent the conveyor and spaced from the conveyor to allow the article to pass intermediate the conveyor and the air nozzle; and (d) an inclined bottom belt having a lower end spaced from the conveyor and an upper end, the bottom belt moving at a second speed greater than the first speed whereby the closure tab is moved by the tab shoe rotating on the shoe drive shaft, the leading edge of the closure tab is pressed onto the top surface of the article and released, the closure tab is bent by air directed from the air nozzle, engaged and moved forwardly with respect to the article trailing surface by the bottom belt and pressed onto the bottom surface.

6. The invention of claim 5, wherein the top belt further comprises an air timing hole whereby air is directed at the article only when the air timing hole is adjacent the air nozzle.

7. The invention of claim 5, wherein the upper end of the bottom belt is positioned to engage the article whereby the closure tab is securely pressed onto the bottom surface by the bottom belt and the article is squeezed between the top belt and the upper end to press the closure tab on to the top and bottom surfaces.

8. The invention of claim 5, further comprising a glue pot on the tab applicator adjacent the tab shoe, a transfer wheel in the glue pot, whereby the closure tab surface having a closure tab thereon bears against the transfer wheel as the tab shoe rotates about the shoe drive shaft to transfer glue onto the closure tab.

9. The invention of claim 5, further comprising a roll of closure tab material on the closure tab applicator, a cutter intermediate the tab shoe and the roll whereby the closure tab is cut from the closure tab material by the cutter and releasably picked up by the tab shoe.

* * * * *